Figure 1:
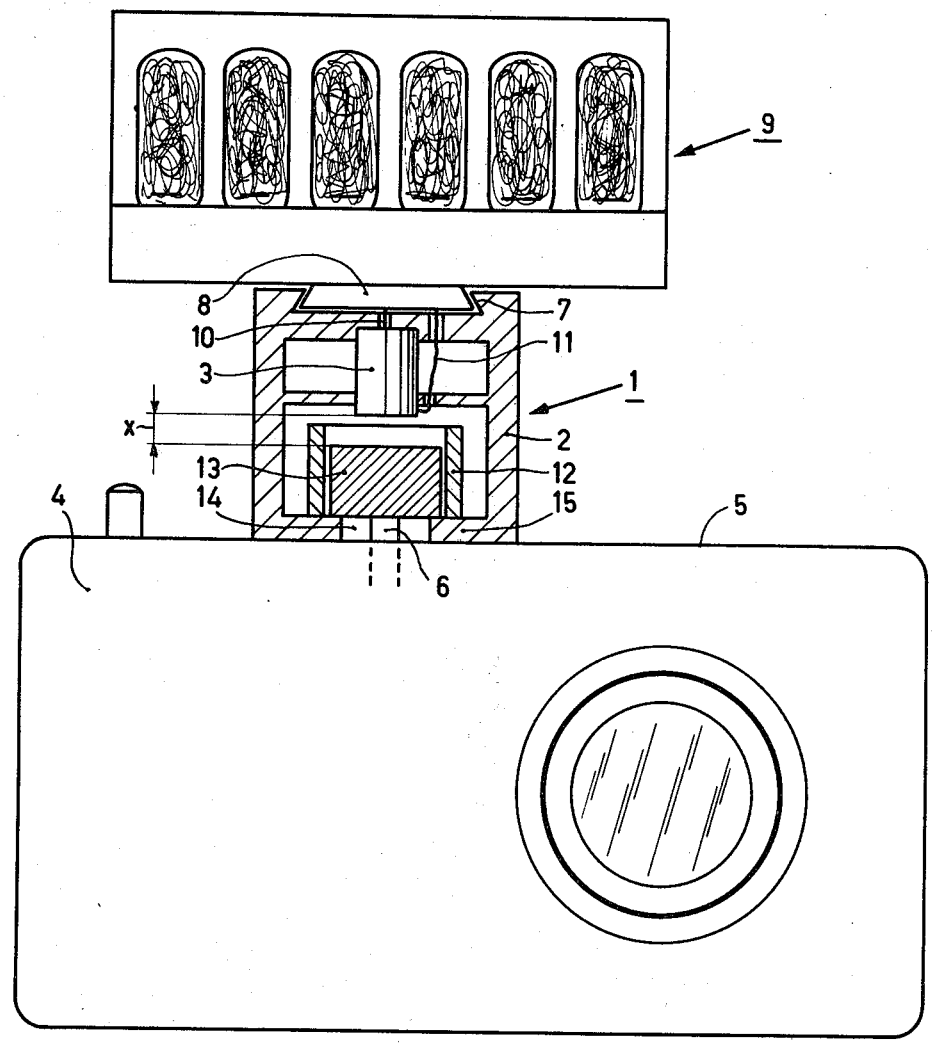

United States Patent [19]
Hörster et al.

[11] 3,919,570
[45] Nov. 11, 1975

[54] PIEZOELECTRIC FLASH-BULB IGNITION DEVICE

[75] Inventors: Horst Hörster, Roetgen; Walter Alfred Pusschert, Aachen; Heinz Schweppe, Aachen-Eilendorf; Wolfram Czarnojan, Aachen, all of Germany

[73] Assignee: U.S. Philips Corporation, New York, N.Y.

[22] Filed: Mar. 11, 1974

[21] Appl. No.: 449,845

[30] Foreign Application Priority Data
Mar. 24, 1973  Germany ........................... 2314820

[52] U.S. Cl. ................... 310/8.7; 240/1.3; 310/9.1; 354/135; 354/141; 354/142
[51] Int. Cl.² ................... H01L 41/04; G03B 15/04
[58] Field of Search ................... 354/135, 141, 142; 240/1.3; 310/8.3, 8.4, 8.7; 317/DIG. 11; 431/92–95

[56] References Cited
UNITED STATES PATENTS

| | | | |
|---|---|---|---|
| 3,464,531 | 9/1969 | Herr et al. | 310/8.3 X |
| 3,528,354 | 9/1970 | Nakagawa et al. | 354/135 |
| 3,672,813 | 6/1972 | Horton | 431/95 |
| 3,758,827 | 9/1973 | Schroder et al. | 317/DIG. 11 |

*Primary Examiner*—Samuel S. Matthews
*Assistant Examiner*—Kenneth C. Hutchison
*Attorney, Agent, or Firm*—Frank R. Trifari

[57] ABSTRACT

The invention relates to a device for igniting flash-bulbs which is adapted to be coupled to a photographic camera and includes a freely movable member which when the shutter mechanism of the camera is operated is accelerated by the action of a pin which is connected to this mechanism and springs out of the camera wall to strike a piezo-electric element to which the flash-bulbs are electrically connected.

5 Claims, 2 Drawing Figures

U.S. Patent  Nov. 11, 1975  3,919,570

PIEZOELECTRIC FLASH-BULB IGNITION DEVICE

The invention relates to a device for igniting at least one flash-bulb, which device is adapted to be coupled to a photographic camera and comprises a housing the wall of which is formed with an opening and in which a piezo-electric element is accommodated which is provided with electric leads for connection to the flash-bulb and is arranged to be mechanically operated by a pin which penetrates into the housing through the opening and forms part of the camera and is coupled to the mechanism of the camera shutter. Such a flash-bulb ignition device is known.

The aforementioned camera is intended to cooperate with a flash-cube containing flash-bulbs provided with what is generally termed percussion ignition. The actuating pin which projects from the surface of the camera extends through the base plate of the flash-cube mounted on the camera and bears with an initial tension against a tensioned spring accommodated in the flash-cube. In a commercially available camera the said initial tensioning force is 0.15 newton. When the camera shutter is operated the operating pin springs out from the surface of the camera and thrusts the tensioned spring past a lug, causing the spring to sharply strike an ignition-sensitive part of a flash-bulb.

The known device suitable for being coupled to such a camera includes a piezo-electric element which is disposed in the housing so that, when the device is coupled to the camera, opening the shutter causes the pin to immediately strike the piezo-electric element. However, this known device has considerable disadvantages:

1. The impulse exerted directly on the piezo-electric elements shakes the camera, which may give rise to blurred pictures.
2. The pin is moved by spring action. When it strikes the piezo-electric element, it first bounces back by the impact and then immediately is caused by the spring force to strike the piezo-electric element again so that a second voltage pulse is produced. When this known device is connected to parallel-connected flash-bulbs which are selectively ignited by an increasing voltage, this second voltage pulse may ignite a second bulb.
3. It has been found that the impulse which the pin of a commercially available camera exerts on the piezo-electric element of the said known device is too weak to ignite a high-voltage flash-bulb.

It is an object of the present invention to provide a device which does not have the said disadvantages.

According to the invention the piezo-electric flash-bulb ignition device is characterized in that the housing of the device accommodates a member which at least in the condition in which the device is coupled to the camera is free to move between the piezo-electric element and the opening in the housing. When the device is coupled to the camera and is ready for flashing — in this connection the term "ready for flashing" is to be understood to mean that the freely movable member is in a position such that it can be hurled away by the pin — the member bears against the edge of the opening in the housing. When the shutter mechanism is operated the pin springs out of the camera through the opening in the housing and accelerates the freely movable member which as a result is hurled towards the piezo-electric element. When it strikes the element an electric voltage pulse is produced. To avoid camera shake due to the impulse exerted on the piezo-electric element by the member the device must be proportioned so that the pin is not in engagement with the member when the latter strikes the piezo-electric element. This ensures that the pin is sufficiently disconnected mechanically from the piezo-electric element. In the device according to the invention no rebound occurs. The device enables the voltage required to ignite a high-voltage expendable flash-bulb to be generated without the risk of double ignition.

An advantageous embodiment of the device according to the invention is characterized in that the member is accommodated in a guide and that in the ready-for-flashing condition the spacing between the member and the piezo-electric element is at least 1 mm and at most 5 mm. The guide may take the form of a cylindrical housing. The mass of the member preferably is at least 10 g and at most 200 g. The velocity at which the member strikes the piezo-electric element is determined by: the impulse of the pin, the mass of the member and the spacing between the member and the piezo-electric element. It has been found that when the spacing between the member and the piezo-electric element and the mass of the member have the aforementioned values the device according to the invention in conjunction with a commercially available camera enables a voltage pulse to be produced which is suitable for selective ignition of a flash-bulb which is connected in parallel with further flash-bulbs. In such flash-bulbs the time derivative of the voltage pulse produced is to be small enough to avoid double ignition.

A further advantageous embodiment of the device according to the invention is characterized in that it includes a latch mechanism a first part of which cooperates with the member and a second part of which is shaped so that the member is unlocked when the device is coupled to the camera. This latch mechanism prevents unintentional ignition of the flashbulbs. More particularly when the device is moved, for example during transport, the latch member avoids the possibility that the member may be thrown against the piezo-electric element with a velocity such as to give rise to unintentional ignition of a flash-bulb.

A further embodiment of the device according to the invention is characterized in that it includes means for securing a holder for one or more high-voltage flash-bulbs. These means may comprise a dovetail-shaped recess which corresponds with a tenon on the flash-bulb holder.

In a still further embodiment of the device according to the invention the device forms part of a unit which in addition to the device contains at least one flash-bulb. The unit may be designed so that the bulbs can be exchanged after use. It may, however, be expendable.

Figure 2:
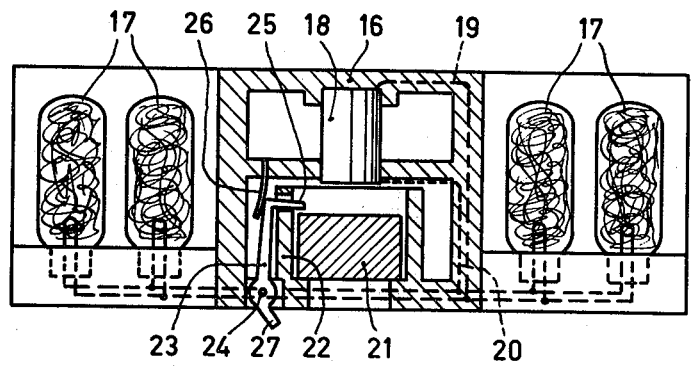

Embodiments of the invention will now be described, by way of example, with reference to the accompanying diagram, in which:

FIG. 1 shows schematically an embodiment of the device according to the invention, and FIG. 2 shows another embodiment thereof.

Referring now to FIG. 1, a device 1 has a housing 2 accommodating a piezo-electric element 3. The device 1 is coupled to a camera 4 which is shown schematically and from a face 5 of which a pin 6 projects which is coupled to the shutter mechanism of the camera. The means by which the device is connected to the camera are not shown. The housing 2 is formed at the top with a dovetail-shaped recess 7 adapted to receive a fitting tenon 8 provided on the bottom of a flash-bulb magazine 9 which contains six high-voltage expendable flash-bulbs.

The piezo-electric element 3 is connected to two electric leads 10 and 11 which terminate in the recess 7 and are connected to the flash-bulbs in the magazine 9 via contacts provided in the tenon 8. The housing 2 further contains a guide in the form of a cylinder 12 which contains a freely movable member 13. In the ready-for-flashing condition of the device shown in FIG. 1 the said member 13 bears on the edge of an opening 14 formed in a bottom 15 of the housing 2. The pin 6 extends in this opening 14.

The device operates as follows: when the shutter mechanism is operated the pin 6 springs through the opening 14 and accelerates the freely movable member 13, the impulse throwing the member upwards. It strikes the piezo-electric element so that an electric voltage is generated which ignites one of the high-voltage expendable flash-bulbs.

The device is proportioned so that at the instant at which the member 13 strikes the piezo-electric element 3 the pin 6 no longer contacts the member 13. As a result the shock imparted to the camera is negligibly small, and no undesirable rebound occurs.

In the embodiment shown in FIG. 1, in the ready-for-flashing condition shown the spacing $x$ between the member 13 and the piezo-electric element is 2.5 mm and the mass of the member is 15 g.

In the embodiment shown in FIG. 2 the device forms part of a unit which in addition to the housing 16 of the device contains four high-voltage flash-bulbs 17. The piezo-electric element is denoted by 18 and the electric leads by 18 and 20. The freely movable member 21 is accommodated in a cylinder 22 which in this embodiment is integral with the housing 16. The device is provided with a latch mechanism comprising an arm 23 pivotably mounted on a spindle 24 secured to the housing 16. A hooked part 25 of the arm 23 holds the member 21 in the locked condition shown. The arm 23 co-operates with a spring 26. When the unit is connected to the camera a lug 27 of the arm 23 is moved to the right (in the Figure) by part of the surface of the camera. As a result the hooked part 25 is moved to the left against the action of the spring, so that the member is unlocked. The latch mechanism prevents undesirable ignition.

Obviously the device need not be combined with a flat flash-bulb magazine. It may also be provided with means for connection to flash-cubes or to a single high-voltage expendable flash-bulb mounted in front of a reflector.

What is claimed is:

1. A device for igniting at least one electrically ignitable flash-bulb, said device including means for attaching said flash-bulb thereto and means for mounting said device to a photographic camera having a shutter and a pin extending from one wall of the camera the associated pin being displaced axially upon actuation of the shutter from a first position to a second position, comprising means for producing an electric potential responsive to axial movement of said pin when said device is mounted on said camera, said means including a piezo-electric element having electric leads connected to the associated flash-bulb when a flash-bulb is attached to said device, a member, means for guiding said member for unrestricted movement toward and away from said element along a path in aligned relationship to the axis of the pin, said member being disposed intermediate said piezo-electric element and said pin when said device is mounted on said camera, said member being disposed in spaced relation to said piezo-electric element when the pin is in the first position, said member impacting said piezo-electric element responsive to the movement of said pin to the second position, said member being disposed in spaced relation to the pin when in contact with said piezo-electric element.

2. A device as claimed in claim 1, wherein when said pin is in said first position the spacing between the member and the piezo-electric element is at least 1 mm and at most 5 mm.

3. A device as claimed in claim 2, wherein the mass of the member is at least 10 g and at most 200 g.

4. A device as claimed in claim 1, further including a pivotally mounted latch arm having a first part which engages said member in a first position, said latch pivoting to a second position out of engagement with said member responsive to attachment of said device to the camera, said latch preventing movement of said member toward said element when engaged.

5. A device as claimed in claim 4, further including means for securing a magazine capable of containing at least one high-voltage flash-bulb to said device.

* * * * *